(12) United States Patent
Gerstadt et al.

(10) Patent No.: US 12,344,114 B2
(45) Date of Patent: Jul. 1, 2025

(54) CHARGING PLUG

(71) Applicant: Mahle International GmbH, Stuttgart (DE)

(72) Inventors: Max Gerstadt, Stuttgart (DE); Walter Krepulat, Stuttgart (DE)

(73) Assignee: Mahle International GmbH (DE)

( * ) Notice: Subject to any disclaimer, the term of this patent is extended or adjusted under 35 U.S.C. 154(b) by 641 days.

(21) Appl. No.: 17/591,595

(22) Filed: Feb. 2, 2022

(65) Prior Publication Data

US 2022/0242265 A1 Aug. 4, 2022

(30) Foreign Application Priority Data

Feb. 3, 2021 (DE) .......................... 102021200966.2

(51) Int. Cl.
*B60L 53/62* (2019.01)
*B60L 53/16* (2019.01)
*B60L 53/18* (2019.01)
*H01R 13/717* (2006.01)

(52) U.S. Cl.
CPC ............... *B60L 53/62* (2019.02); *B60L 53/16* (2019.02); *B60L 53/18* (2019.02); *H01R 13/7175* (2013.01)

(58) Field of Classification Search
CPC .......... B60L 53/62; B60L 53/16; B60L 53/18; B60L 2250/16; B60L 53/665; B60L 53/31; H01R 13/7175; H01R 13/66; H01R 24/00; H01R 2201/26
USPC .......................................................... 320/109
See application file for complete search history.

(56) References Cited

U.S. PATENT DOCUMENTS

| 5,614,808 | A | 3/1997 | Konoya et al. |
| 2011/0062913 | A1* | 3/2011 | Lin ........................ H02J 7/1415 320/101 |
| 2013/0179061 | A1* | 7/2013 | Gadh .................... B60L 53/305 701/1 |
| 2014/0179164 | A1* | 6/2014 | Kanamori ............... B60L 53/65 439/620.21 |
| 2015/0316595 | A1* | 11/2015 | Creekmore ............ H01H 9/181 324/103 R |
| 2020/0175551 | A1* | 6/2020 | Penilla ..................... B60L 53/80 |
| 2020/0198473 | A1* | 6/2020 | Sanders ................. G01R 19/10 |
| 2020/0223319 | A1* | 7/2020 | Uhlenbrock ............ B60L 53/18 |
| 2021/0091439 | A1* | 3/2021 | Reeves .............. G06Q 30/0283 |

(Continued)

FOREIGN PATENT DOCUMENTS

| CN | 202997609 U | 6/2013 |
| CN | 205724984 U | 11/2016 |
| CN | 108099676 A | 6/2018 |

(Continued)

OTHER PUBLICATIONS

German Search Report for DE-102021200966.2, dated Nov. 2, 2021.

(Continued)

*Primary Examiner* — Paul Dinh
(74) *Attorney, Agent, or Firm* — Fishman Stewart PLLC

(57) ABSTRACT

A charging plug for a charging cable for an electric vehicle is disclosed. The charging plug includes a charge indicator provided on the charging plug. The charge indicator is configured such that it indicates a charging progress. The charging plug is used, e.g., in connection with a charging station for an electric vehicle.

20 Claims, 1 Drawing Sheet

(56) References Cited

U.S. PATENT DOCUMENTS

2021/0221247 A1* 7/2021 Daniel ................ G06N 3/0464
2022/0161670 A1* 5/2022 Bönsch ................ H01R 13/502

FOREIGN PATENT DOCUMENTS

CN      110869237 A     3/2020
DE    102012021502 A1     5/2014

OTHER PUBLICATIONS

English abstract for DE-102012021502.
Chinese Office Action dated Oct. 29, 2024 and Chinese Search Report dated Oct. 27, 2024 for Chinese Patent Application No. 202210104878.4.

* cited by examiner

CHARGING PLUG

CROSS-REFERENCE TO RELATED APPLICATION

This application claims priority to Germany Application No. DE 10 2021 200 966.2 filed on Feb. 3, 2021, the contents of which are hereby incorporated by reference in its entirety.

TECHNICAL FIELD

The present invention relates to a charging plug for a charging cable of a charging station for an electric vehicle. In addition, the invention relates to a charging cable having such a charging plug and to a charging station having such a charging cable.

BACKGROUND

The increasing electromobility with an increasing number of electric vehicles is also accompanied by an increasing number of charging columns or charging points. Here, so-called wall boxes or charging columns are distinguished, on which a display is usually made available to a user on which a charging operation currently taking place is visualised and quantified.

In the case of a central charging infrastructure by contrast, which supplies, for example, co-called day parkers and fleet operators with electric energy, a central and intelligent control unit including permanently connected cables with plugs instead of charging columns is usually employed at the parking bay. Because of the intelligent charging system and the "design to cost" approach, high investments in particular in expanding the network connection as well as the time for constructing such a charging infrastructure can be avoided. By way of a dynamic, phase-individual load management, the available charging power is distributed over the electric vehicles to be charged by a central control unit.

The major advantages of such a central charging infrastructure are in particular reduced maintenance costs, reduced costs in the event of an accident or vandalism, maximum comfort for an end-user, a highly dynamic and also phase-individual load management, a combination with battery accumulators and photovoltaics and an increased electrical safety. Disadvantageous with such a central charging infrastructure however is that a user is not informed about a current charging operation as is usually the case on for example public charging columns or wall boxes.

The present invention therefore deals with the problem of stating an improved or at least an alternative embodiment for a charging plug of the generic type, by means of which in particular the disadvantages known from the prior art in conjunction with a central charging infrastructure can be overcome.

According to the invention, this problem is solved through the subject of the independent claim(s). Advantageous embodiments are subject of the dependent claims.

SUMMARY

The present invention is based on the general idea of providing a charge indicator directly on a charging plug for a charging cable of a charging station for an electric vehicle. By way of this charge indicator directly integrated in the charging plug a user can have a progress in the charging operation visually shown to himself/herself. By means of such a charging plug the user is thus comparatively easily informed regarding the respective charging progress without, for example, an indicator on a charging socket or in the electric vehicle or even an app being required for this purpose. Through the charge indicator arranged in the charging plug according to the invention, a substantial increase in comfort for the user can thus be achieved.

In an advantageous further development of the solution according to the invention, the charge indicator comprises a display with a loading bar or a loading circle. By means of such a well-known loading bar or a loading circle a respective charging progress and, for example, also a charging state of a battery to be charged can be very easily indicated to a user, wherein obviously a percentage indication is also alternatively conceivable, which likewise provides information visually very easily and intuitively regarding the charging progress or the charging status of the electric vehicle. Loading bars are known, for example, from a wide variety of applications in particular also from the field of smartphones and, just like percentage indications, are therefore already accessible and understandable to a majority of people.

Practically, the charge indicator indicates electric energy transmitted via the charging plug in kilowatt hours. In order to be able, for example, to estimate the costs that are/were incurred during the respective charging operation or how much energy is/was transmitted to the electric vehicle, it is particularly advantageous when via the charge indicator, i.e. for example the display, the energy transmitted via the charging plug is indicated in kilowatt hours. Such an indication of transmitted kilowatt hours additionally makes it possible for a user to comparatively easily estimate if the transmitted amount of energy is sufficient for the onward journey or for reaching the next destination. Because of this, a significantly improved route planning is also possible. Thus, a cost control is also comparatively easily possible.

In a further advantageous embodiment of the solution according to the invention, a supply of the charge indicator with electric energy takes place conductively or inductively. A conductive supply of the charge indicator with electric energy can take place, for example, by way of a CP line (control pilot), a phase conductor or an additional electrical line. With a CP line, control signals for example, can be exchanged between the electric vehicle and the charging station. Such a CP line can report, for example by way of a pulse width modulation, a maximum current to the electric vehicle that can be made available by a charging column or a charging station. By way of a phase conductor or generally an additional electrical line in the charging cable, the indicating device, in particular the electronics or display of the same, can also be supplied with electric energy.

Likewise conceivable is an inductive supply of the charge indicator with electric energy via a secondary conductor that is inductively coupled to a primary conductor, namely a phase or phase conductor or a neutral conductor, namely a wire. For inductively supplying the indicating device with current, a wire (secondary conductor) is wound for example about the phase or neutral conductor (primary conductor), by way of which the two conductors are inductively coupled. Here, the wire of the winding of the secondary conductor runs parallel to the primary conductor, for example, to the phase or neutral conductor, so that an inductive coupling is possible. In order to improve the coupling, a ferrite core can be utilised about which the winding of the secondary conductor is passed. It is thus conceivable that the ferrite core is, for example, formed tube-like and accommodates the primary conductor itself. On the inner lateral surface and the outer lateral surface of the ferrite core, the wires of the secondary conductor thus run parallel to the primary conductor.

With the help of the power inductively transmitted to the secondary conductor, the indicating device can be supplied with electric energy. A simple possible construction in this case would be, for example, the previously described inductive coupling, wherein an illuminant, for example, a light-emitting diode, is connected to the secondary conductors. This illuminant would light up as soon as current flows through the primary conductor (phase conductor or neutral conductor). The illuminant might require a ballast resistor in order to limit the current through the same.

Advantageously, the secondary conductor (coil) for the energy supply of the display is situated in the charging plug and not in a separate electronic box.

The current flowing through the conductor L1 induces a voltage which in turn causes the LED to flicker. The advantage here is that the quicker the electric vehicle is charging, the more rapidly the LED flickers. Thus, an indicator directly in the charging plug without external cabling or additional energy sources would be available for a few cents. This would provide the user himself/herself or a third party with a direct indication as to whether the electric vehicle is still being charged.

Further, the present invention is based on the general idea of equipping a charging cable with such a charging plug according to any one of the preceding paragraphs, wherein the charging cable can be generally connected to a central charging infrastructure. Purely theoretically, however, it is also conceivable that such a charging cable with a charging plug according to the invention can be connected to different charging infrastructures or charging stations. In this case, the charge indicator functions independently of the charging station, provided the same is not supplied via additional conductors. The supply via the phase conductor (inductively and/or conductively) and the CP signal should work on all charging stations. Since only few charging columns have a permanently connected cable, the integration in a mobile charging cable is also possible, as is needed or can be used with most public charging columns.

Further, the present invention is based on the general idea of equipping a charging station with a charging cable described in the preceding paragraph, or with a charging plug described in the preceding paragraphs and by way of this create a central charging infrastructure for the first time, with which a user, without further aids, such as for example apps or a charge indication in the electric vehicle, can directly understand a charging progress or a charging status directly on the charging plug. By way of this, a substantial increase in comfort for the user can be achieved since the charge indication is activated and functions directly on the charging plug and without further aids provided the charging cable with the charging plug is connected on the one hand to the charging station and on the other hand to an electric vehicle in a current transmitting manner.

Further important features and advantageous of the invention are obtained from the subclaims, from the drawings and from the associated figure description by way of the drawings.

It is to be understood that the features mentioned above and still to be explained in the following cannot only be used in the respective combinations stated, but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

There it shows, in each case schematically.

DETAILED DESCRIPTION

Figure 1:
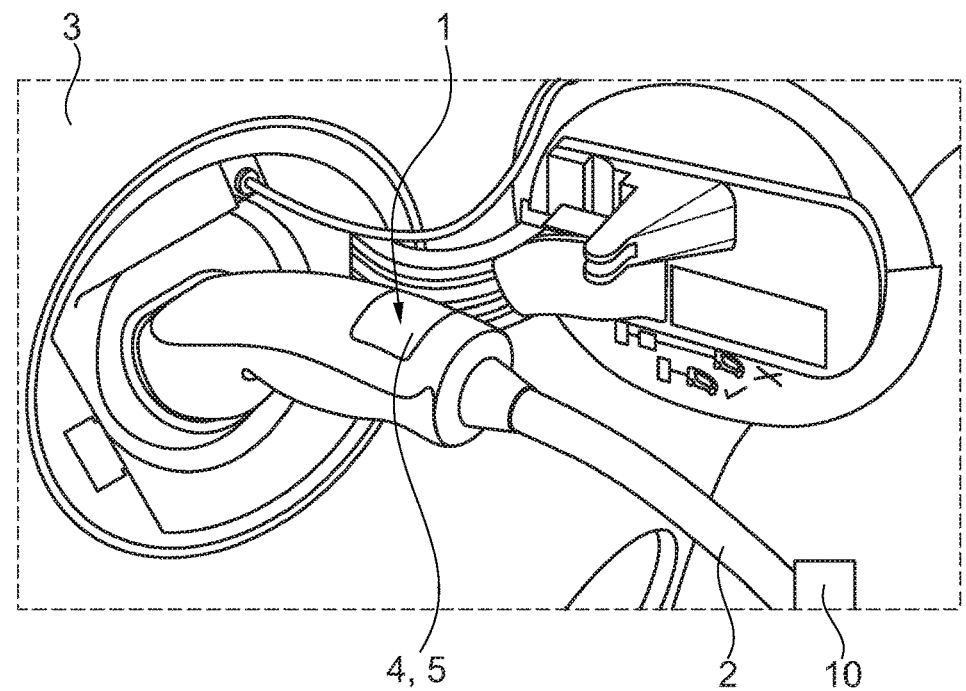
FIG. 1 a charging plug according to the invention on a charging cable according to the invention, FIG. 2 a plan view of the charging plug according to the invention in the region of the charge indication.
Figure 2:
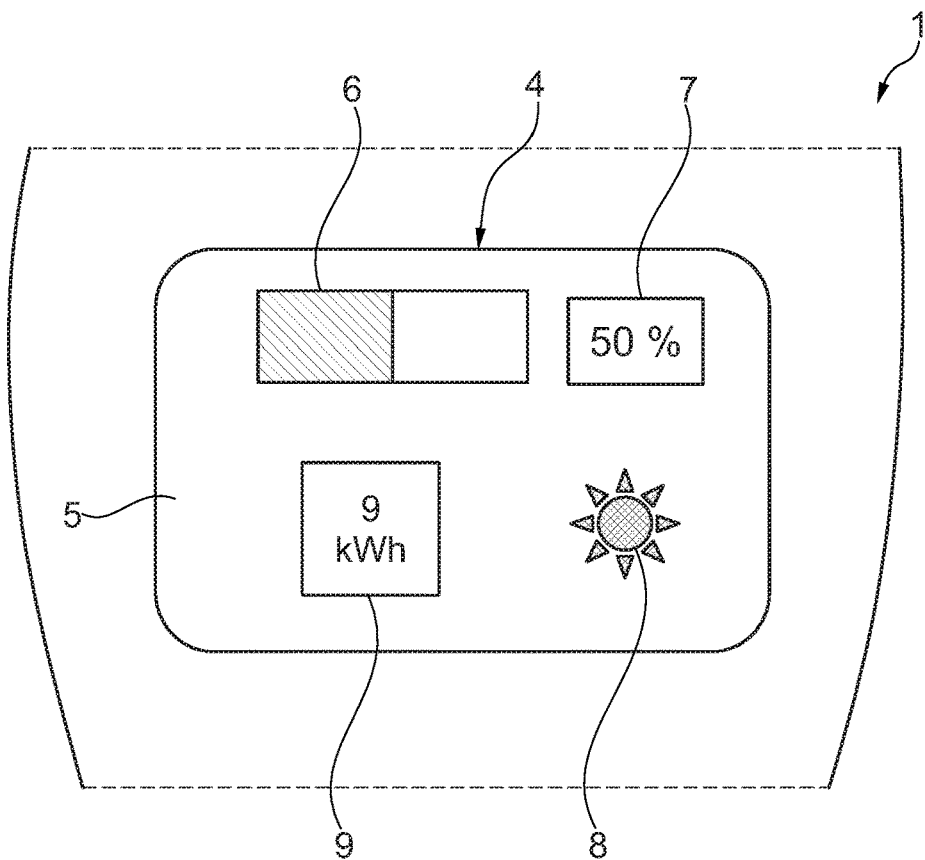

According to the FIGS. 1 and 2, a charging plug 1 according to the invention, which can be arranged on a charging cable 2 according to the invention of a charging station 10 which is not shown in more detail, and can be used for charging an electric vehicle 3, comprises a charge indicator 4, in particular on a back of the charging plug 1. The charge indicator 4 can comprise, for example, a display 5 with a loading bar 6, a loading circle not referred to in more detail, or a percentage indicator 7. By way of the loading bar 6 or the percentage charge indicator 7, but also by way of the loading circle a charging progress can be visually understood comparatively easily and intuitively. In the simplest form, the charge indicator 4 can also obviously comprise only a light-emitting diode 8, which changes for example from red to green from a predefined charging state of a battery in the electric vehicle 3.

According to FIG. 2, the loading bar 6, the percentage charge indicator 7 and the light-emitting diode 8 are cumulatively arranged in the display 5, wherein it is obviously also conceivable that these are provided alternatively.

In addition to this, the charge indicator 4 can comprise an indicator 9, via which the energy transmitted to the electric vehicle 3 via the charging plug 1 is indicated in kilowatt hours. By way of this, it is possible for a user, for example, to easily understand and estimate the amount of electric energy transmitted to the electric vehicle 3, whether the transmitted quantity of energy is sufficient for reaching a predefined destination or generally for the onward journey. A visually simple cost control is also possible here because of this. According to FIG. 2, the amount of energy transmitted to the electric vehicle 3 is 9 kWh.

The electrical supply of the charge indicator 4 can take place conductively or inductively, wherein, for example, a conductive supply of the charge indicator 4 with electric energy can take place, for example, by way of a CP line, a phase conductor or an additional electrical line in the charge cable 2 which is not defined or referred to in more detail. By way of a CP line, signals for example, are exchanged between the electric vehicle 3 and the charging station 10.

An inductive supply of the charge indicator 4 with electric energy can take place, for example, by way of a secondary conductor, namely for example, a wire, that is inductively coupled to a primary conductor, namely a phase conductor or a neutral conductor. For this purpose, a wire can be provided which surrounds the phase conductor in the charging cable 2 or in the charging plug 1 and because of this utilises an inductive energy transmission to the wire for the electric energy supply of the charge indicator 4. The wire of the winding of the secondary conductor runs parallel to the primary conductor, for example, to the phase or neutral conductor, so that an inductive coupling is possible. In order to improve the coupling, a ferrite core can be utilised about which the winding of the secondary conductor is passed/wound.

Advantageously, the secondary conductor (coil) for the energy supply of the display 5 is situated in the charging plug 1 and not in a separate electronic box.

The current flowing through the primary conductor induces a voltage which in turn causes the LED 8 to flicker. The advantage here is that the quicker the electric vehicle 3 is charging, the quicker the LED 8 flickers. Thus, one would have, for a few cents, a charge indicator 4 directly in the charging plug 1 without external cabling or additional energy source. By way of this, one, as user or as third party, would directly have an indication whether the electric vehicle 3 is still being charged.

Regardless of the selected type of charge indicator 4, such a charge indicator 4 allows a user to visually easily and intuitively understand a charging progress without a separate indicating device having to be provided, for example, on the charging station 10, or an app having to be installed for this purpose. For controlling the charge indicator 4, an electronic device can be provided, for example, which is installed under the charge indicator 4 in the charging plug 1.

Here, the display 5 can be formed flat or bent, wherein in particular the bent design or a bent covering with a transparent cover represents a particularly attractive design possibility. A bent display 5, flush with the surface, can merge into the surface of the charging plug 2 surrounding the display 5. Such a charging plug 1 according to the invention can be connected to a charging station 10 via a charging cable 2 according to the invention, wherein the charging station 10 can be, for example, a part of a central charging infrastructure having multiple charging cables 2. Obviously, such a charging cable 2 with such a charging plug 1 according to the invention can also be realised as a detachable or portable charging cable 2, which can be carried along, for example, in the electric vehicle 3.

In addition, the display 9 can be embodied as a so-called e-ink display, so that the value of the charged kWh is/remains visible even after the charging operation after the energy supply has already been disconnected. The indicator 9 would be reset again at the next charging operation. Should the charging point fail or no current flow, this becomes noticeable immediately by the absent illumination or the absent output on the indicator 9.

By way of the indicator 9 or the display or a different-colour LED, the user could also be informed regarding error statuses.

In addition to this, price information (prior to and during the charging operation), the maximum possible charging current or maintenance information (charging point not available) can also be indicated via the indicator 9.

The invention claimed is:

1. A charging plug for a charging cable for an electric vehicle, comprising:
   a charge indicator provided on a portion thereof, the charge indicator comprising a light-emitting diode (LED);
   wherein the charge indicator includes an indication of an amount of energy transmitted via the charging plug in kilowatt hours (kWh);
   a secondary conductor, wherein an inductive supply of the charge indicator with electric energy takes place via the secondary conductor that is inductively coupled to a primary conductor, wherein the secondary conductor is situated in the charging plug; and
   wherein the LED is connected to the secondary conductor.

2. The charging plug according to claim 1, wherein the charge indicator is configured such that it indicates a charging progress.

3. The charging plug according to claim 1, wherein the charge indicator comprises a display including at least one of a loading bar and a percentage indication.

4. The charging plug according to claim 3, wherein the display is structured flat or bent or has a bent covering.

5. The charging plug according to claim 1, wherein:
   current flowing through the secondary conductor causes the LED to flicker, whereby the quicker the electric vehicle charges, the more rapidly the LED flickers.

6. The charging plug according to claim 1, wherein the primary conductor is a phase conductor or a neutral conductor.

7. The charging plug according to claim 1, wherein the secondary conductor is a wire that is wound about the primary conductor, wherein the wire of the secondary conductor runs parallel to the primary conductor.

8. The charging plug according to claim 1, wherein the light-emitting diode is connected directly to the secondary conductor.

9. A charging cable, comprising:
   a charging plug including a charge indicator provided on the charging plug, the charge indicator comprising a light-emitting diode (LED);
   wherein the charge indicator includes an indication of an amount of energy transmitted via the charging plug in kilowatt hours (kWh);
   a secondary conductor, wherein an inductive supply of the charge indicator with electric energy takes place via the secondary conductor that is inductively coupled to a primary conductor, wherein the secondary conductor is situated in the charging plug; and
   wherein the LED is connected to the secondary conductor.

10. The charging cable according to claim 9, wherein the charge indicator comprises a display including at least one of a loading bar and a percentage indication.

11. The charging cable according to claim 9, wherein the charge indicator further comprises an indication for energy in kWh transmitted via the charging plug.

12. The charging cable according to claim 9, wherein the secondary conductor is a wire that is wound about the primary conductor, wherein the wire of the secondary conductor runs parallel to the primary conductor.

13. The charging cable according to claim 9, wherein the light-emitting diode is connected directly via a ballast resistor to the secondary conductor.

14. The charging cable according to claim 9, wherein the primary conductor is a phase conductor or a neutral conductor.

15. A charging station for an electric vehicle, comprising:
   a charging cable including a charging plug, the charging plug including a charge indicator provided on the charging plug, the charge indicator including a light-emitting diode (LED);
   wherein the charging plug further includes a secondary conductor for inductively supplying energy to the charge indicator, wherein the LED flickers when current flows through the secondary conductor, whereby the quicker the electric vehicle charges, the more rapidly the LED flickers; and
   wherein the secondary conductor is situated in the charging plug.

16. The charging station according to claim 15, wherein charge indicator comprises a display including at least one of a loading bar and a percentage indication, and wherein a supply of the charge indicator with electric energy takes place conductively or inductively.

17. The charging plug according to claim 1, wherein the light-emitting diode is connected via a ballast resistor to the inductively coupled secondary conductor.

18. The charging station according to claim 15, wherein the secondary conductor is inductively coupled to a primary conductor in the charging plug.

19. The charging station according to claim 18, wherein the secondary conductor is a wire that is wound about the primary conductor, and wherein the wire of the secondary conductor runs parallel to the primary conductor.

20. The charging station according to claim 18, wherein the primary conductor is a phase conductor or a neutral conductor.

\* \* \* \* \*